Patented Sept. 28, 1948

2,450,333

UNITED STATES PATENT OFFICE 2,450,333

POLYHYDRIC ALCOHOL ESTERS

Melvin De Groote, University City, and Arthur F. Wirtel, Kirkwood, Mo., assignors to Petrolite Corporation, Ltd., Wilmington, Del., a corporation of Delaware No Drawing. Original application July 13, 1945, Serial No. 604,994. Divided and this application November 5, 1946, Serial No. 707,979

8 Claims. (Cl. 252—405)

This invention relates to new chemical products or compounds, and to the manufacture of said products, our present application being a division of our pending application Serial No. 604,994, filed July 13, 1945, now U. S. Patent 2,442,074, issued May 25, 1948.

One object of our invention is to provide new materials, chemical products or compositions of matter that are adapted for various uses.

Another object is to provide a practical method of making said new materials or chemical products.

The new materials, compositions of matter, or chemical products herein described, consist of an ester containing a polyhydric alcohol radical, a diglycollic acid radical, and an acyloxy radical, derived from a detergent-forming monocarboxy acid having 8 to 32 carbon atoms, at least one polyhydric alcohol hydroxyl being esterified with a group containing such acyloxy radical and the number of such groups esterified with polyhydric alcohol hydroxyls being less than the total number of polyhydric alcohol hydroxyls (esterified or unesterified) of polyhydric alcohol contained in the product. In other words, the number of the groups comprising an acyloxy radical containing 8 to 32 carbon atoms and derived from a detergent-forming monocarboxy acid having 8 to 32 carbon atoms that are ester-linked to at least one polyhydric alcohol radical, is less than the valency of the said polyhydric alcohol radical.

Detergent-forming monocarboxy acids are those acids having at least 8 carbon atoms which have the capacity to react with alkali to form soap or soap-like products and are exemplified by fatty acids containing 8 to 32 carbon atoms, such as oleic, linoleic, ricinoleic, stearic, hydroxystearic, palmitic, linolenic, erucic, clupanodonic, myristic, etc., and fatty acids of the character referred to are normally regarded as preferable. The term detergent-forming carboxy acid includes naphthenic acids. Naphthenic acids are derived from various petroleums, or are obtained by treatments which involve oxidation of hydrocarbon bodies present in the naturally-occurring crude oils. The number of carbon atoms in naturally-occurring naphthenic acids may vary from 10 carbon atoms to 32 or even to 38 carbon atoms. Naphthenic acid or admixtures of the type available on the open market and which preferably have a saponification value in the neighborhood of about 250, are suitable. Naphthenic acids of the kind referred to are readily esterified with glycerol to form naphthenin on intimate admixture and agitation in the presence of dried hydrochloric acid gas, using a procedure that is substantially the same as that generally employed in the formation of stearin from stearic acid and glycerol. It is known that such naphthenic acid can be treated, for example, with halogens so as to produce derivatives such as chloronaphthenic acid. Also included among the detergent-forming acids, are those monocarboxy acids sometimes called wax acids or paraffin acids, which are formed as a result of oxidation of paraffin or petroleum waxes, particularly those derived from paraffin base hydrocarbons and which include hydroxylated, as well as non-hydroxylated acids. Acids occurring in certain waxes such as carnaubic acid, cerotic acid, lanopalmic acid and lanoceric acid, are considered detergent-forming monocarboxy acids. Rosin and resinic acids, such as abietic acid, are likewise included. Such acid materials, due to the fact that they react with alkalis to form soap or soap-like products, are commonly called detergent-forming acids.

The terms "hydroxylated detergent-forming acids" and "hydroxy detergent-forming acids," refer to those detergent-forming acids which contain in the acyl radical thereof an hydroxyl or the equivalent. The most common types of hydroxylated detergent-forming carboxy acids are hydroxylated fatty acids containing 8 to 32 carbon atoms, such as ricinoleic acid, mono- and dihydroxystearic acid, trihydroxypalmitic acid, etc. Ester products adapted for use in the invention herein described, contain at least one radical of an hydroxylated detergent-forming acid, and preferably, such radical is a radical of an hydroxylated fatty acid containing 8 to 32 carbon atoms. In addition, hydroxylated detergent-forming acids such as hydroxylated wax acids, may be used.

While the terms detergent-forming monocarboxy acid and hydroxylated detergent-forming monocarboxy acid, include oxidized acids, as well as acids in their naturally-occurring state, those fatty bodies which are drastically-oxidized have distinctive properties and characteristics and certain ester products containing such drastically-oxidized bodies are claimed in our co-pending application, Serial No. 604,996, filed July 13, 1945, now abandoned.

One simple type of esterification product that is illustrative of ester products referred to above, is derivable in the following manner: A detergent-forming monocarboxy acid, e. g., a fatty acid, such as oleic acid or stearic acid, may be represented as RCOOH, wherein RCOO is the conventional acyloxy radical. Such acid may be esterified with a polyhydric alcohol so as to yield a partial ester containing a free hydroxyl in the alcoholic residue. Thus, if 1 mole of the detergent-forming acid (e. g., stearic acid) is reacted with one mole of glycol, the reaction may be indicated as follows:

$$RCOOH + C_2H_4(OH)_2 \rightarrow RCOOC_2H_4OH + H_2O$$

The partial or fractional ester thus formed may be reacted with diglycollic acid and used for the herein described purposes. The reaction involved may be indicated thus:

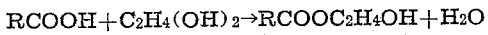
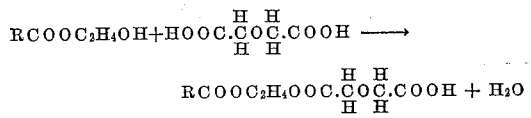

Similarly, a detergent-forming acid of the RCOOH type may be reacted with glycerol or polyglycols or polyglycerols. Typical partial esters containing a polyhydric alcohol radical and containing one or more hydroxyl groups which are not esterified with a group containing acyloxy radical derived from a detergent-forming carboxy acid, are:

$$RCOOC_3H_5(OH)_2$$
$$(RCOO)_2C_3H_5OH$$
$$RCOOC_2H_4OC_2H_4OH$$
$$(RCOO)_2C_3H_5OC_3H_5(OH)_2$$

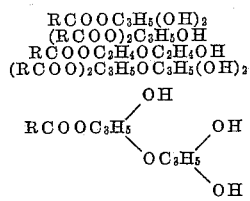

The reaction of the first compound indicated above with diglycollic acid, serves to illustrate this particular type; and may be indicated as follows:

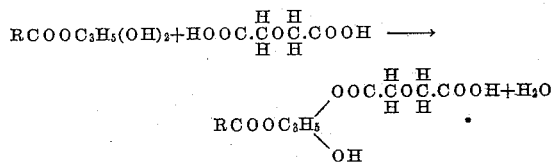

The other free hydroxyl radical may also be esterified with a molecule of diglycollic acid. Likewise, similar reactions with any or all of the free hydroxyls of the other compounds listed above may take place to yield products of esterification suitable for the purposes herein indicated.

Other examples of polyhydric alcohols which may be employed to form partial esters of the character referred to, are ethylene glycol, alpha beta gamma butane triol, beta methyl glycol, triethylene glycol, 1,3-propane diol, isobutylene glycol, ethylene glycol, glycerol ether, monoethylene glycol ether, mannitol, sorbitol, sorbitol monobutyl ether, erythritol, andonitol, mannitan, sorbitan, etc.

While, as above illustrated, a detergent-forming monocarboxy acid may be reacted with a polyhydric alcohol to yield a partial ester having one or more residual hydroxyls available for esterification with diglycollic acid, it is also possible to first react diglycollic acid with a polyhydric alcohol to yield an ester having one or more unreacted hydroxyl groups available for esterification with a detergent-forming monocarboxy acid. However, the reaction is usually easier to control, if the polyhydric alcohol used is first reacted with a detergent-forming acid and the fractional ester thus obtained is subsequently reacted with diglycollic acid. In either case, the resulting product is regarded as a product of esterification between diglycollic acid and an hydroxylated ester of a detergent forming monocarboxy acid.

The hydroxy esters employed for reaction with diglycollic acid to form ester products for the hereindescribed purposes, need not necessarily be prepared by reacting the detergent-forming acid with the polyhydric alcohol directly. In many instances, it is more convenient to prepare these hydroxy esters by re-esterification of fats, oils, or detergent-forming acid esters with polyhydric alcohols. For example, a fat such as stearin may be re-esterified with glycerol to form glyceryl monostearate, which may subsequently be reacted with diglycollic acid. Such partial esters are mentioned, inasmuch as they are commonly produced and available on the open market. Similar products are obtained by re-esterification of oils, fats, and detergent-forming acid esters with other polyhydric alcohols, such as diglycerol, glycols, sorbitol, mannitol, etc. Analogous partial esters may be obtained from rosin acid, naphthenic acid, or the like.

It is also possible to perform the re-esterification simultaneously with the esterification of diglycollic acid. For example, a mixture of a fatty oil, a polyhydric alcohol and diglycollic acid, may be mixed and heated together to yield an ester product that may be used according to this invention.

If the detergent-forming carboxy acid is hydroxylated, e. g., is an hydroxylated fatty acid such as ricinoleic acid, hydroxystearic acid, or the like, and has the carboxylic hydrogen atom replaced by a hydrocarbon or oxyhydrocarbon containing one or more hydroxyls, the foregoing typical formulae for hydroxyl-containing esters of detergent-forming carboxy acids would appear as $$OHRCOOC_3H_5(OH)_2$$
$$(OHRCOO)_2C_3H_5OH$$
$$OHRCOOC_2H_4OH$$
$$OHRCOOC_2H_4OC_2H_4OH$$
$$(OHRCOO)_2C_3H_5OC_3H_4(OH)_2$$

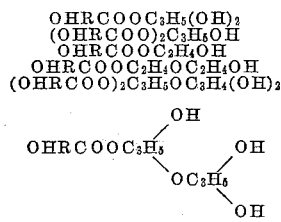

Examples of such materials are glyceryl monoricinoleate, glyceryl diricinoleate, ethylene glycol dihydroxystearate, sorbitol di-dihydroxystearate, etc.

Taking the first of the foregoing formulae as illustrative, the reaction with diglycollic acid may result in a number of ester products, the following being illustrative:

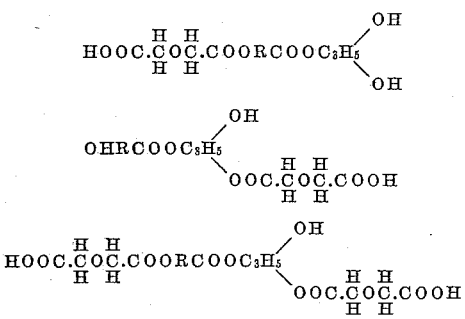

Similarly, one or more of the hydroxyl radicals of the other compounds may become esterified with a carboxyl radical of diglycollic acid.

If esterification conditions are quite severe i. e., at a relatively high temperature and for a prolonged interval of time, both carboxyls of diglycollic acid may react with hydroxyls present in a partial ester, so as to form a multi-atomic ring. Such compounds may be illustrated by the following formula:

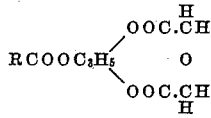

in which there is no free carboxyl and which comprises a closed ring structure heterocyclic in character. While such compounds are suitable, it is preferable that the reaction be carried out, so that there will be a free carboxyl group in the ester product. Whether or not the ultimate ester product contains a residual hydroxyl group is largely immaterial.

In carrying out an esterification reaction involving a polyhydric alcohol, a detergent-forming carboxy acid and diglycollic acid, it does not necessarily follow that the polyhydric alcohol radical inevitably becomes directly connected to the acyloxy group of the detergent-forming carboxy acid when the detergent-forming carboxy acid is hydroxylated. For example, a detergent-forming carboxylic body such as ricinoleic acid ethyl ester, may be esterified with diglycollic acid so as to form the partial ester:

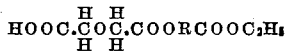

which may be further esterified with glycol, for example, to form a product which may be represented by the formula:

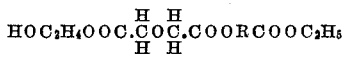

and it may be noted that the product contains a polyhydric alcohol radical and contains only one acyloxy radical derived from a detergent-forming carboxy acid in a group that is esterified with an hydroxyl of the polyhydric alcohol. Since part only of the hydroxyl radicals contained in the parent polyhydric alcohol are esterified with a group containing such acyloxy radical, the compound above mentioned falls within the ester products of the present invention for use in connection with the herein described purposes. In this particular instance the group containing the acyloxy radical (RCOO) that is esterified with an hydroxyl of the parent polyhydric alcohol, is the group:

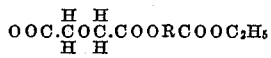

A preferred type of compound of the character just described and illustrated, may be prepared by first reacting a glyceride or a glycol ester with diglycollic acid, and then neutralizing a free carboxyl group of diglycollic acid by esterification with a polyhydric alcohol. For example, one mole of a triglyceride such as triricinolein, may be esterified with two moles of diglycollic acid to produce di(diglycollated) ricinolein which may be represented by the following formula:

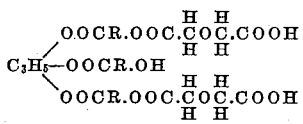

If 1 mole of di(diglycollated) triricinolein is then esterified with 2 moles of glycerol, the following product may be obtained.

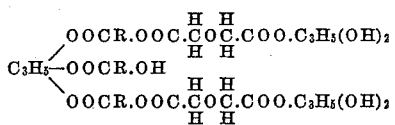

Likewise, one may esterify only one carboxyl radical, if desired.

If 2 moles of di-(diglycollated) triricinolein are reacted with one mole of glycol, for example, a more complex molecule may be formed by cross linkage through the glycol residue, as represented by the following formula:

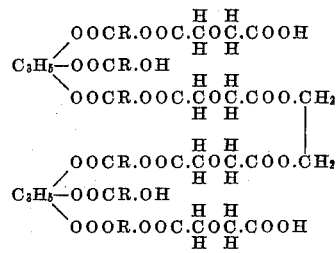

Similarly, 1 mole of tri-(diglycollated) triricinolein may react with 1 mole of glycol to form a compound which may be represented by the following formula:

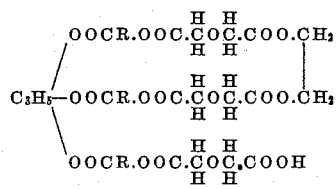

Another example is the resultant of an esterification reaction between triricinolein and diglycollic acid which may comprise more complex molecules, such as the following; which illustrate cross linkage through the polyhydric residue:

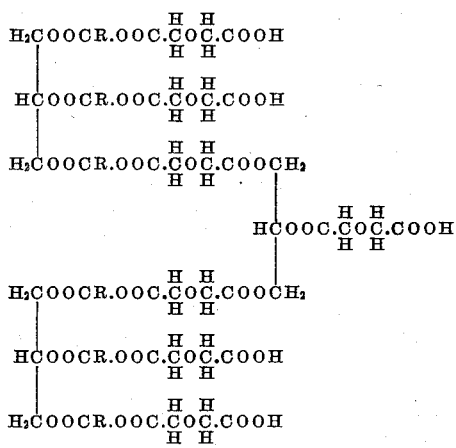

All of the compounds of the character above referred to are regarded as ester products derivable by reaction between diglycollic acid and a hydroxy compound containing an acyloxy radical derived from a detergent-forming monocarboxy acid having 8 to 32 carbon atoms and containing a polyhydric alcohol residue, the number of groups that contain an acyloxy radical derived from a detergent-forming monocarboxy acid and that are esterified with a polyhydric alcohol hydroxyl, being less than the total number of polyhydric alcohol hydroxyls (esterified or unesterified) of polyhydric alcohol contained in the product. In such compounds it is preferable that there be at least one free carboxyl group, and preferably, as part of a diglycollic acid radical, and also preferably a free hydroxyl radical in addition.

In the esterification product the presence of a residual hydroxyl group is desirable, but may be eliminated. Thus, any such residual hydroxyl group may be left as such, or, if desired, may be reacted either with additional diglycollic acid, or with monobasic detergent-forming carboxy acid, provided the number of acyloxy groups derived from the detergent-forming carboxy acid is maintained less than the number of hydroxyls of the parent polyhydric alcohol material contained in the ester product as a residue. Alternatively, any such residual hydroxyl may be acylated with monocarboxy acids having less than 8 carbon atoms. The ester product covered herein may include such simple acylated derivatives.

While reference has been made previously to various detergent-forming monocarboxy acids, it is apparent that simple derivatives, such as the halogenated compounds, are functional equivalents. For example, chlorinated ricinoleic acid, or chlorinated triricinolein may be employed instead of ricinoleic acid, or triricinolein. Brominated oleic acid may be used instead of oleic acid. Also hydrogenated abietic acid may be used instead of abietic acid. In such cases the monobasic detergent-forming carboxy material, notwithstanding modifications of the kind indicated, still has the same functional properties as the unmodified material, and thus acts in the same manner, as far as esterification reactions of the character herein described are concerned. It is also possible, for example, to condense two moles of ricinoleic acid and produce one mole of monobasic diricinoleic acid. Likewise, monobasic triricinoleic acid and monobasic tetraricinoleic acid may be used. Also the condensation product of a substance such as ricinoleic acid or hydroxystearic acid, with some non-fatty hydroxy acid, such as lactic acid, may be used. It is to be understood that the term detergent-forming monobasic carboxy acid includes such functional equivalents.

Some of the ester products above described are somewhat soluble in oil, while others are substantially insoluble in oil. If the ester product is such that only one part or less is soluble (as determined by usual visual methods) in one thousand parts of ordinary straight-run kerosene from Pennsylvania crude, the product is to be regarded as substantially insoluble in oil. For use in increasing the dirt removal rate of filtering media, as hereinafter explained, it is preferable that the ester product be substantially insoluble in oil. Most of the ester products hereinabove described are sub-resinous in character and of a tarry or balsam-like consistency. In the case of some of the interacting materials, especially the polyhydroxylated bodies, it is possible, by prolonged heating at relatively high temperatures, to obtain a product that is of a hard, horny character and lacks appreciable solubility in oil or in lower aliphatic alcohols. Care should be taken not to produce such hard and totally oil-insoluble bodies. It may be mentioned, however, that a trace of solubility such as a few parts dissolving in one hundred thousand parts of kerosene of the character above mentioned, affords a satisfactory product for increasing the filtering rate of filtering media in the filtering procedure which constitutes one feature of our present invention.

Generally speaking, the esters hereinabove described are substantially water-insoluble, i. e., are not soluble in 1 part to 1,000 parts of water at 50° F. Water solubility can be increased by obvious variants, as, for example, in the instance of intermediate compounds derived from ethylene glycol, such as the following:

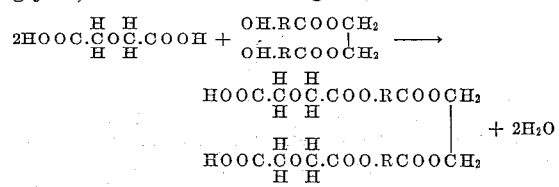

Naturally, if ethylene glycol is replaced by diethylene glycol, water solubility is enhanced. This is also true if triethylene glycol, tetraethylene glycol, or some higher homologue in the series is employed. Similarly, some other polyhydric alcohol, such as, for example, glycerol, diglycol, sorbitol, sorbitan, pentaerythritol, or the like can be treated with an alkylene oxide, such as ethylene oxide, propylene oxide, butylene oxide, or the like, to produce ether alcohols, or more specifically, etherified diols or etherified triols, in which the ether linkage occurs one time, or perhaps, several times at each original hydroxyl position. Thus, following such procedure, one may obtain compounds which are actually water-soluble. In a broader sense then, the compounds herein contemplated may be oil-soluble, or oil-insoluble; they may be water-soluble, or water-insoluble, and may, in fact, show little or no solubility in either oil or water. This latter statement is something of a paradox, but it is to be emphasized that these esters are frequently effective at enormous dilutions, when used as demulsifiers for water-in-oil emulsions. For instance, we have repeatedly conducted experimental tests in which the ratios employed vary from 1 part of demulsifier to 10,000 and at times, up to 50,000 parts of emulsion. For practical purposes, when a compound is soluble in less than 1 part to 10,000, it is commonly referred to as "insoluble", but in such extremely dilute range the word "insoluble" is purely relative, and perhaps meaningless.

As an example of enhanced water solubility, one need only replace ethyleneglycol with non-aethyleneglycol, or some higher homologue, such as examples where $n$ in the following formula represents values from 7 to 15. Compare this formula with an analogue involving ricinoelic acid ester of ethyleneglycol:

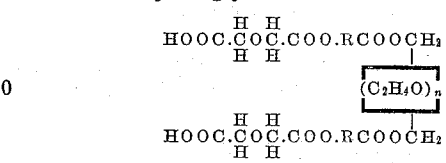

Nonaethyleneglycol hexaricinoleate, a product which is commercially available, is of distinct utility when converted into acidic glycollic acid esters. Such esters can be esterified further with polyhydric alcohols of the kind herein defined.

In the preparation of esterification products, the esterfication reaction may be caused to take place readily upon the application of heat, the reaction being more rapid the higher the temperature that is employed, but care should be taken not to employ excessively high temperatures which would cause decomposition. The reaction, may, if desired, be in the presence of an inert solvent, such as xylene, which may be removed upon the completion of the reaction. When water is formed as a reaction product, the esterfication reaction may be conducted under a reflux condenser, using a water trap to remove water as it is formed. The reaction can also be hastened by passing through the reacting materials a dried inert gas such as nitrogen or $CO_2$. If desired, a small amount of catalyst, for instance, one-half to one and one-half percent of toluene sulfonic caid, may be added. Generally speaking, however, the reactions take place rapidly, quickly and completely by simply heating substances to enter into the reaction in desired stoichiometric proportions at a temperature above the boiling point of water, usually between about 110° and 160° C., provided there is no decomposition. The most desirable products are obtained by combinations, in which the ratio of moles of diglycollic acid to moles of particular material reacting therewith are within the ratios of 1 to 3 and 3 to 1.

Esterification reactions of the kind contemplated are used for the production of a wide variety of esters, resinous materials, sub-resinous materials, and include plasticizers. Attention is directed to the following patents, which are a cross-section of conventional esterification procedure which can be applied in any instance to the production of the herein contemplated esters.

British Patent No. 422,845, January 14, 1935; British Patent to Eckey, 500,765, February 15, 1939; U. S. Patent to Malm, 2,170,030, August 22, 1939; Bradley, 2,166,542, July 18, 1939; Barrett, 2,142,989, January 10, 1939; Frazier, 2,075,107, March 30, 1937; Sly, 2,073,031, March 9, 1937; Bradley, 1,951,593, March 20, 1934; Lawson, 1,909,196, May 16, 1933; Kessler, 1,714,173, May 21, 1929; Van Schaack, 1,706,639, March 26, 1929; Jones, 2,264,759, December 2, 1941; Wietzel, 1,732,392, October 22, 1929; Groves et al., 1,993,738, March 12, 1935.

Attention is directed to a comprehensive article entitled "Polyhydric alcohol esters of fatty acids, their preparation, properties and uses," by H. A. Goldsmith, in Chemical Reviews, volume 33, December 1943, Number 3.

The following are specific examples of the preparation of preferred products for use for the particular purpose herein indicated.

Example 1

92 pounds of glycerol are added to 932 pounds of castor oil and the mixture stirred and heated to 250° C. for approximately 15 minutes. The mixture is allowed to cool to 200° C., and 500 pounds of diglycollic acid added and stirred in. Temperature is kept at 200° C. for from 1 to 6 hours, after which it is permited to cool and is diluted with from 10 to 50% of a suitable solvent. The progress of the reaction can be determined by the usual analytical procedure involving the acid number. As the diglycollic acid combines, the acid number decreases. When the acid number, due to the diglycollic acid, is one-half its original value, showing that one carboxyl of the diglycollic acid is combined, reaction should be stopped. The reaction may be hastened by passing through dry carbon dioxide, or adding a quarter of a percent of one of the conventional catalysts, such as toluene sulfonic acid.

Example 2

One pound mole of diethylene glycol (mono) ricinoleate being an amber oil having a specific gravity approximating that of water and a saponification number of 150 to 160, is esterified in the conventional manner ordinarily used in the production of phthalated derivatives with one pound mole of diglycollic acid. In brief, the procedure employs rapid agitation so as to keep the two reactants thoroughly mixed at approximately 250° C. or slightly less. The reaction is stopped just as soon as one carboxyl radical has combined. Such point is indicated by the acid number. Generally speaking, such reaction is complete in two to 8 hours. It can be hastened by passing through dry carbon dioxide or adding a quarter of a percent of one of the conventional catalysts, such as toluene sulfonic acid.

Example 3

One pound mole of diethylene glycol glyceryl (mono) ricinoleate being a dark red oil, specific gravity about 0.95 and having a saponification value of 180 to 210, is substituted for the ricinoleate in Example 2, preceding.

Example 4

Diethylene glycol glyceryl (mono) ricinoleate being a dark orange oil having a specific gravity of 0.99 and a saponification value of 133 to 140, is substituted for the ricinoleate in Example 2, preceding.

Example 5

The same procedure is followed as in Example 4, immediately preceding, except that the molal quantity of diglycollic acid employed is doubled.

Example 6

Glyceryl (mono) ricinoleate, an orange oil having a specific gravity of 1.02 and a saponification number of 120 to 130, is substituted for the fractional ester in preceding experiments 4 and 5.

Example 7

Mannitol (tri) ricinoleate, a dark amber, viscous liquid having a specific gravity of 0.97 and a saponification number of 172 to 179, is substituted for the fractional ester in Examples 4 and 5, preceding.

Example 8

The same procedure is followed as in Example 7, immediately preceding, except that 3 moles of diglycollic acid are employed instead of 1 and 2 moles for each mole of the ricinoleate.

Example 9

Mannitol glyceryl (mono) stearate, a tan waxy product, having a specific gravity of 1.01 and a saponification number of 109 to 119, is used instead of ricinoleate at Examples 7 and 8, immediately preceding.

Example 10

Sorbitol (tri) ricinoleate, a brown viscous liquid having a specific gravity of 0.96 and a saponification number of 172 to 179, is substituted for the fractional ester, in Examples 7 and 8, immediately preceding.

Specific examples of compounds which can be readily prepared from commercial products, include monoricinolein monodiglycollate, monoricinolein di (diglycollate), diricinolein mono (diglycollate), diricinolein di (diglycollate) and similar diglycollates, in which the precentage of diglycollic acid has been increased, that is, a mixture of the diglycollates and triglycollates.

In the preparation of esters, particularly partial esters, from detergent-forming monocarboxy acids, and particularly higher fatty acids, one may employ other procedures. See Oil and Soap, volume 21, No. 5, page 145; volume 22, No. 3, page 57. For instance, pentaerythritol triricinoleate can be prepared by treating pentaerythritol with ketone so as to prepare the triacetate, and likewise, treating triricinolein with methyl or ethyl alcohol to form methyl or ethyl ricinoleate, and reacting such low molal triacetate under conditions described in the aforementioned articles, so as to yield methyl or ethyl acetate and the triricinoleate.

We wish to emphasize the fact that the most outstanding compounds herein contemplated for breaking petroleum emulsion, particularly from a viewpoint of effectiveness as demulsifiers, as well as ease and economy of manufacture, are those obtained by reaction between one pound mole of triricinolein and at least one pound mole of a polyhydric alcohol having at least 2 and not more than 4 hydroxyl radicals, such as ethylene glycol, glycerol, diglycerol, etc., followed by reaction with a plurality of pound moles of diglycollic acid without any subsequent change in respect to the uncombined carboxylic hydrogen atoms. Note particularly, preceding Example 1 illustrates this type of material. Such compounds are so outstanding that they represent, in effect, an invention within an invention. Such compounds of outstanding effectiveness for breaking petroleum emulsions, are limited to those which are substantially insoluble in both crude oil and in water.

What has just been said, applies with particular force to those examples which are obtained from selected reactants in such a manner that there is present not only free carboxyl radicals, but also uncombined hydroxyl radicals.

The herein described new materials, compositions of matter, or chemical products, may be employed for a variety of purposes. Two important purposes include (1) Use as a demulsifier for breaking petroleum emulsions, as previously mentioned; and (2) Use as a break inducer in sweetening hydrocarbon oils in the manner described in U. S. Patent No. 2,157,223, dated May 7, 1939, to Sutton.

Some of the ester products above described are somewhat soluble in oil, while others are substantially insoluble in oil. If the ester product is such that only 1 part or less is soluble (as determined by usual visual methods) in 1,000 parts of ordinary straight-run kerosene from Pennsylvania crude, the product is to be regarded as substantially insoluble in oil. Most of the ester products hereinabove described are sub-resinous in character and of a tarry or balsam-like consistency. In the case of some of the interacting materials, especially the polyhydroxylated fatty bodies, it is possible, by prolonged heating, at relatively high temperatures, to obtain a product that is of a hard, horny character and lacks appreciable solubility in oil or in lower aliphatic alcohols. Care should be taken not to produce such hard and totally oil-insoluble bodies.

As to using compounds of the kind herein described as flooding agents for recovering oil from subterranean strata, reference is made to the procedure described in detail in U. S. Patent No. 2,226,119, dated December 24, 1940, to De Grooote and Keiser. As to using compounds of the kind herein described as demulsifiers, or in particular as surface tension depressants, in combination with mineral acid or acidization of oil-bearing strata, reference is made to U. S. Patent No. 2,233,383, dated February 25, 1941, to De Groote and Keiser.

The polyhydric alcohol esters herein contemplated for reaction with diglycollic acid, may be considered as being in the class of an alcohol, i. e., a monohydric alcohol, or a polyhydric alcohol. For instance, diolein would exemplify a mono-hydric alcohol, whereas, mono-olein, mono-ricinolein, diricinolein, etc. would represent a polyhydric alcohol. If an alcohol is indicated by the formula:

$$X'(OH)_n$$

where $n$ indicates the number 1 or more, and if diglycollic acid be indicated for convenience by the formula:

$$X'(COOH)_2$$

then the reaction between an alcohol and a diglycollic acid will result in a compound which may be indicated by the following formula:

$$YX(COOH)_{n'}$$

where $n'$ indicates the number 1 or more, and which is, in reality, a contraction of a more elaborate structural formula, in which $X'$ and $Y'$ are joined by a carboxyl radical or residue. Assuming, however, as would be true in the majority of cases, that the alcohol actually would be a polyhydric alcohol, then examination reveals that the formula might result in a combination, in which there were neither residual carboxyl radicals, nor residual hydroxyl radicals, or might result in compounds in which there were residual hydroxyl radicals and no residual carboxyl radicals, or compounds where there might be residual carboxyl radicals and no residual hydroxyl radicals; or there might be both. This is indicated by the following:

$$(Y.X)_q(OH)_{n'}$$
$$(Y.X)_2(COOH)_{m'}$$
$$(OH)_{n''}(YX)_q(COOH)_{m''}$$

in which $q$ indicates a small whole number (one in the case of a monomer and probably not over 10, and usually less than 6), and $m'$ and $n'$ indicate the number one or more, and $m''$ and $n''$ indicate a small or moderately-sized whole number, such as 0, 1 or more, but in any event, probably a number not in excess of 10. Actually, the preferable type of reagent would be more apt to contain less than 8, and in fact, less than 6 free hydroxyl radicals. It is not necessary to remark that residual carboxyl radicals can be permitted to remain as such, or can be converted in any suitable manner, into an ester. Conversion into the ester would be by means of a monohydric alcohol such as methyl alcohol, ethyl alcohol, propyl elcohol, butyl alcohol, hexyl alcohol, etc.

For practical purposes, however, we have found that the most desirable products are obtained by combinations, in which the ratio of the alcoholic reactant to the acid is within the ratio of three to one and one to five, and in which the molecular weight of the resultant product does not exceed 5,000, and is usually less than 5,000, and preferably, less than 3,000. This is particularly true if the resultant product is soluble to a fairly definite extent, for instance, at least 5% in some solvent, such as water, alcohol, benzene, dichloroethyl ether, acetone, cresylic acid, or the like.

This is simply another way of stating that it is preferable that the product be of the type, which is commonly referred to as an A resin, or a B resin, as distinguished from a C resin, which is a highly infusible, insoluble resin (see Ellis, Chemistry of Synthetic Resins (1935), pages 862, et seq.)

In recapitulating what has been said previously, the product herein contemplated may be indicated by the following formula:

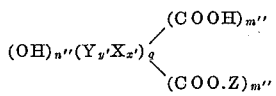

in which the characters have their previous significance, and $y'$ represents a small whole number not greater than 3, and $x'$ represents a small whole number not greater than 5; $q$ is a small whole number less than 10, and preferably 1 to 5. Z represents a hydrogen ion equivalent, such as a hydrogen atom, or an organic radical derived from a monohydric alcohol.

Materials having the repetitious unit appearing 3 to 10 times and having a plurality of free carboxyl radicals or free hydroxyl radicals, or both, are well known in a variety of forms and find practical application in demulsification of crude oil emulsions. Generally speaking, the molecular weight of such materials, regardless of class, is less than 10,000 and is more apt to be in a range of 3,000 to 5,000 as an upper limit. A more elaborate description of this type of material appears in numerous patents concerned with demulsification of crude oil emulsions, and reference is made to such patents for a more elaborate description.

Attention is directed to our co-pending applications filed July 13, 1945, Serial Nos. 604,993, Patent No. 2,442,073, issued May 25, 1948, 604,995, now abandoned, 604,997, Patent No. 2,442,075, issued May 25, 1948, 604,998, now abandoned, 604,999, Patent No. 2,442,076, issued May 25, 1948, 605,000, now abandoned, 605,001, now abandoned, and 605,002, Patent No. 2,442,077, issued May 25, 1948, all of which are related to the present application, in that such co-pending applications are concerned, among other things, with the breaking of oil field emulsions by means of demulsifiers containing a diglycollic acid radical.

Having thus described our invention, what we claim as new and desire to secure by Letters Patent is:

1. An acidic partial ester containing: (a) A polyhydric alcohol radical; (b) A diglycollic acid radical; and (c) An acyloxy radical containing 8 to 32 carbon atoms derived from a detergent-forming monocarboxy acid having 8 to 32 carbon atoms, at least one polyhydric alcohol radical being ester-linked with a group containing said acyloxy radical and the number of said groups ester-linked with at least one polyhydric alcohol radical being less than the valency of said polyhydric alcohol radical.

2. An ester, as described in claim 1, wherein there is present not over one polyhydric alcohol radical for each acyloxy radical.

3. An ester, as described in claim 1, wherein there is present not over one polyhydric alcohol radical for each acyloxy radical, and each of said acyloxy radicals is an acyloxy radical derived from a fatty acid having 8 to 32 carbon atoms.

4. An ester, as described in claim 1, wherein there is present not over one polyhydric alcohol radical for each acyloxy radical; each of said acyloxy radicals is an acyloxy radical derived from a fatty acid having 8 to 32 carbon atoms, and each of said acyloxy radicals is an acyloxy radical derived from an hydroxylated fatty acid having 8 to 32 carbon atoms.

5. An ester, as described in claim 1, wherein there is present only one polyhydric alcohol radical, and all detergent-forming monocarboxy acyloxy radicals are ricinoleic acid radicals.

6. Diricinolein mono-diglycollate.
7. Diricinolein di-diglycollate.
8. Diricinolein tri-diglycollate.

MELVIN DE GROOTE.
ARTHUR F. WIRTEL.

REFERENCES CITED

The following references are of record in the file of this patent:

UNITED STATES PATENTS

| Number | Name | Date |
|---|---|---|
| 2,015,145 | Hubbuch | Sept. 24, 1935 |
| 2,197,269 | Guillaudeu | Apr. 16, 1940 |